US009615423B2

(12) United States Patent
Manor

(10) Patent No.: US 9,615,423 B2
(45) Date of Patent: Apr. 4, 2017

(54) PROTECTION CIRCUIT AND METHOD AGAINST INTERFERENCE IN LIGHTING SYSTEMS

(71) Applicant: Magnitude Lighting Transformers Inc., Tustin, CA (US)

(72) Inventor: Dror Manor, Herzliya (IL)

(73) Assignee: MAGNITUDE HOLDINGS LTD., A BERMUDA EXEMPT COMPANY LIMITED BY SHARES, Boston, MA (US)

( * ) Notice: Subject to any disclaimer, the term of this patent is extended or adjusted under 35 U.S.C. 154(b) by 256 days.

(21) Appl. No.: 14/474,191

(22) Filed: Sep. 1, 2014

(65) Prior Publication Data

US 2015/0061494 A1 Mar. 5, 2015

Related U.S. Application Data

(60) Provisional application No. 61/872,774, filed on Sep. 2, 2013.

(51) Int. Cl.
*H05B 33/08* (2006.01)

(52) U.S. Cl.
CPC ....... *H05B 33/089* (2013.01); *H05B 33/0815* (2013.01); *Y02B 20/341* (2013.01); *Y02B 20/347* (2013.01)

(58) Field of Classification Search
CPC ............ H05B 33/0809; H05B 33/0815; H05B 33/089; Y02B 20/341; Y02B 20/347
USPC .......................................................... 361/92
See application file for complete search history.

(56) References Cited

U.S. PATENT DOCUMENTS

2014/0333228 A1* 11/2014 Angeles ............ H05B 33/0815
315/291

* cited by examiner

*Primary Examiner* — Thienvu Tran
*Assistant Examiner* — Kevin J Comber
(74) *Attorney, Agent, or Firm* — Edward Langer

(57) ABSTRACT

A protection circuit for lighting drivers is provided, wherein a lighting driver is coupled to an AC voltage source. The protection circuit comprises a loading circuit, coupled to the AC voltage source and operable to load it with a loading current, and a monitoring and control (M&C) circuit. The M&C circuit is coupled to the AC voltage source for detecting interference pulses thereon and causes the loading circuit to load the AC voltage source with the loading current during a certain loading time starting upon detecting an interference pulse, indiscriminately of the interference pulse polarity. The protection circuit thereby prevents the AC source current from dropping to zero in response to the interference pulse. When the AC voltage source comprises a lighting dimmer, preventing the current from dropping to zero prevents cutout of the lighting dimmer due to an interference pulse that causes a momentary drop of the AC voltage.

24 Claims, 4 Drawing Sheets

PROTECTION CIRCUIT AND METHOD AGAINST INTERFERENCE IN LIGHTING SYSTEMS

FIELD OF THE INVENTION

The present invention relates generally to lighting systems, and more particularly, to methods and circuits for protecting lighting systems from interference.

BACKGROUND OF THE INVENTION

Electronic lighting drivers have become a common means for driving modern lighting sources, typically Light Emitting Diodes (LEDs). Such a driver is sometimes fed through a traditional triac based lighting dimmer, connected to an AC voltage mains source. In this case undesirable interference might occur. A common interference type appears as voltage surges on the mains line, which might adversely affect the proper operation of a lighting driver.

A method and device for protecting lighting drivers from surges is described and claimed in U.S. Pat. No. 8,284,536 to Minarczyk et al. Minarczyk et al. discloses a surge protection device in the current path between a power supply and a lighting driver comprising a serial fuse and a metal oxide varistor (MOV) connected to ground. The surge protection device detects and absorbs the excess energy of surges on the power supply.

Another problem arises, in the case of an external electronic lighting dimmer, when the driver's input capacitance charges during the external dimmer's conducting period and prevents a voltage drop from developing on the external dimmer's control circuits during the dimmer cutoff period. A method and device for mitigating this problem was suggested in our previous U.S. patent application 61/081,483, the disclosure of which is incorporated herein by reference. In this publication, a loading current is applied to load the external lighting dimmer whenever the instantaneous mains AC voltage is lower than a given threshold.

However, the protection techniques that are known in the art do not provide an appropriate solution to the problem of negative interference pulses on the power supply, which decrease the instantaneous voltage and energy transferred to a lighting driver. In a lighting system wherein the lighting driver is fed through a lighting dimmer, such interference pulses may cause the lighting dimmer to cut out and, consequently, the lighting driver to drop. Negative interference pulses may result, for example, from lighting dimmers connected on the same mains line as the interfered lighting driver.

SUMMARY OF THE INVENTION

Accordingly, it is a principal object of the present invention to provide improved techniques to avoid vulnerability of a lighting driver which is powered by a lighting dimmer to abrupt interference pulses on the mains voltage, in particular such pulses that decrease the instantaneous voltage supplied to the lighting dimmer.

In accordance with an embodiment of the present invention, there is provided a protection circuit for a lighting driver, wherein the lighting driver is coupled to an AC voltage source for receiving an AC voltage and an AC current therefrom, the protection circuit comprising:

a loading circuit, coupled to the AC voltage source and operable to load it with a loading current; and a monitoring and control (M&C) circuit, coupled to the AC voltage source for detecting interference pulses thereon and configured to cause the loading circuit to load the AC voltage source with the loading current during a certain loading time starting upon detecting an interference pulse, indiscriminately of the interference pulse polarity, thereby preventing the AC current from dropping to zero in response to the interference pulse.

In some embodiments of the protection circuit, the M&C circuit comprises a rectifier circuit for detecting the interference pulses indiscriminately of the polarity thereof.

In some embodiments of the protection circuit, the M&C circuit is configured to set the loading time longer than an expected maximum width of the interference pulse.

In some embodiments of the protection circuit, the M&C circuit is further configured to cause the loading circuit to terminate the loading current gradually.

In some embodiments of the protection circuit, the M&C circuit is further configured to cause the loading circuit to load the AC voltage source with the loading current whenever the AC voltage is lower than a given threshold.

In some embodiments of the protection circuit, the lighting driver is configured to drive one or more light emitting diodes (LEDs).

In some embodiments of the protection circuit, the AC voltage source comprises a lighting dimmer for transferring the AC current and the AC voltage to the lighting driver, the lighting driver is coupled to the lighting dimmer through a radio frequency interference (RFI) filter connected to an output of the lighting dimmer, and the lighting driver is connected to an output of the RFI filter.

In some embodiments of the protection circuit, the loading circuit is coupled to the AC voltage source by being connected to the RFI filter output.

In some embodiments of the protection circuit, the loading circuit is coupled to the AC voltage source by being connected to the lighting dimmer output.

In some embodiments of the protection circuit, the RFI filter comprises a filtering capacitor coupled to a filtering inductor through an isolating inductor, and the loading circuit is coupled to the AC voltage source by being connected to a connection point between the filtering inductor and the isolating inductor.

In accordance with an embodiment of the present invention, there is further provided a lighting apparatus comprising:

a lighting driver;

a radio frequency interference (RFI) filter, having an output connected to an input of the lighting driver and an input connected to an output of a lighting dimmer, wherein the lighting dimmer transfers an AC current received from an AC voltage source for providing lighting power; and a protection circuit comprising:

a loading circuit, coupled to the lighting dimmer and operable to load the lighting dimmer with a loading current; and a monitoring and control (M&C) circuit, coupled to the lighting dimmer for detecting interference pulses on the AC voltage and configured to cause the loading circuit to load the lighting dimmer with the loading current during a certain loading time starting upon detecting an interference pulse, indiscriminately of the interference pulse polarity, thereby preventing the current transferred by the lighting dimmer from dropping to zero.

In accordance with an embodiment of the present invention, there is further provided a method for protecting a lighting system from interference pulses, the lighting system comprising a lighting driver coupled to an AC voltage source for receiving an AC voltage and an AC current therefrom, the method comprising:

monitoring the AC voltage source for detecting interference pulses thereon; and loading the AC voltage source with a loading current during a certain loading time starting upon detecting an interference pulse, indiscriminately of the interference pulse polarity, thereby preventing the AC current from dropping to zero in response to the interference pulse.

These and other features and benefits of the invention disclosed herein will be more fully understood upon consideration of the following description and the accompanying drawings.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF EMBODIMENTS

Embodiments of the present invention provide improved techniques and circuits for protecting lighting systems against interference pulses, typically momentary mains voltage drops, which might result in operation interruptions. In an embodiment of the present invention, which comprises a LED lighting driver powered through a lighting dimmer, a new protection circuit is disclosed comprising a loading circuit. The loading circuit is activated so as to trigger loading of the lighting dimmer once an interference pulse is detected, indiscriminately of the interference pulse polarity. The added loading prevents the AC current flowing through the lighting dimmer from dropping to zero and thus turning it off, as explained below in detail.

Figure 1A:
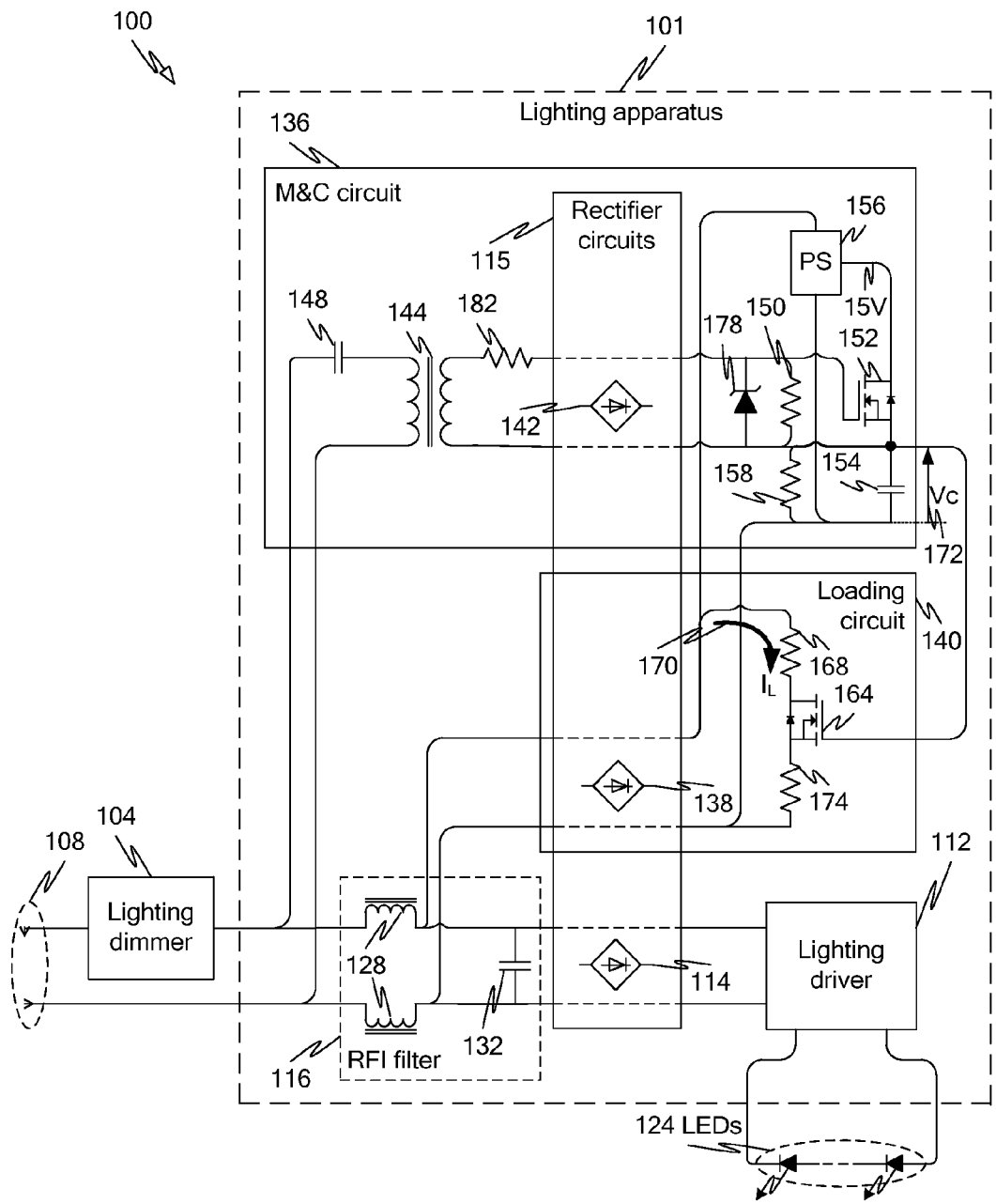
FIG. 1A is a block diagram that schematically illustrates a lighting system and apparatus, in accordance with an embodiment of the present invention.

Referring to FIG. 1A, there is shown a block diagram that schematically illustrates a lighting system 100, in accordance with an embodiment of the present invention. As shown in the figure, a lighting apparatus 101 receives an AC voltage through a lighting dimmer 104 from an AC voltage source 108, typically a mains line. In lighting apparatus 101, a lighting driver 112 is coupled to the external lighting dimmer 104, through a rectifier circuit 114 and a Radio Frequency Interference (RFI) filter 116. The RFI filter serves to block switching harmonics, generated in lighting driver 112, from contaminating the mains voltage. In an embodiment, lighting driver 112 drives one or more LEDs 124. However, in other embodiments, any suitable light sources can be driven by lighting driver 112 using the disclosed techniques. RFI filter 116 comprises a filtering inductor 128 and a filtering capacitor 132, denoted for short inductor 128 and capacitor 132 respectively. Inductor 128 is divided into two halves so as to ensure balanced operation. Rectifier circuit 114 is depicted within a rectifier circuits block 115 for the sake of drawing clarity.

The following explains how an interference pulse on mains line 108 that results in a momentary mains voltage drop, would impact the operation of a lighting driver in a lighting apparatus in which the disclosed techniques are not implemented: The voltage on capacitor 132 remains effectively unchanged while the voltage at the output of lighting dimmer 104 drops due to the interference pulse. Consequently, the current through inductor 128 tends to reverse its direction, which cuts off lighting dimmer 104. Lighting driver 112 then fails as well, which causes LEDs 124 to cut out. It should be noted that interference pulses on mains line 108 that result in a momentary mains voltage rise are less prone to cause malfunction of lighting dimmer 104, however they are also mitigated by the disclosed protection circuit.

Next described are a Monitoring and Control (M&C) circuit 136 and a loading circuit 140, both constituting the protection circuit, in accordance with an embodiment of the present invention. In M&C circuit 136, a primary winding of an isolation transformer 144 is coupled through a coupling capacitor 148 to lighting dimmer 104. A resistor 150 that loads a secondary winding of transformer 144 forms, together with capacitor 148, a high pass filter for passing through leading edges of interference pulses. Transformer 144 also adapts the amplitude of the transferred pulses to the subsequent circuitry.

M&C circuit 136 detects an interference pulse as follows: Once an interference pulse appears on mains line 108, capacitor 148, transformer 144 and a rectifier circuit 142 pass it to resistor 150 at the input of a switch 152. Rectifier circuit 142 serves to always ensure positive voltage pulses at the input of switch 152 indiscriminately of the detected interference pulses.

Once an interference pulse is detected and applied to the input of switch 152, as described above, if the pulse amplitude is sufficiently high to saturate the switch, a power supply 156 then charges a capacitor 154 to 15 volts through saturated switch 152. Switch 152, capacitor 154 and a discharge resistor 158 form a control circuit, issuing a control signal 172 denoted Vc, which controls the operation of loading circuit 140 as described below. Zener diode 178 and resistor 182 constitute a limiting circuit which protects the input of switch 152 from overvoltage.

When capacitor 154 is charged to 15 volts, Vc drives a switch 164, in loading circuit 140, into saturation. Switch 164 is connected, through a limiting resistor 168, to a rectified voltage produced by a rectifier circuit 138, thereby coupled to the output of RFI filter 116. As long as switch 164 is in saturation, the current flowing through it is effectively affected only by resistor 168, since resistor 168 is substantially larger than a resistor 174 which closes the current loop through switch 164. This current is denoted in FIG. 1 as $I_L$ 170, standing for loading current, since it as well flows, as an alternating current, through lighting dimmer 104. This way lighting dimmer 104 is protected from current cutoff when an interference pulse tends to reverse the current direction through inductor 128. The overall time during which $I_L$ loads lighting dimmer 104 is denoted $T_L$, representing loading time.

When the voltage pulse at the input of switch 152 terminates, switch 152 turns off, and capacitor 154 starts to discharge through resistor 158. However, Vc remains sufficiently high to retain switch 164 in saturation for a time period T1, which is longer than the widest expected interference pulse. During the loading time that follows T1, Vc becomes sufficiently low such that the voltage drop on resistor 174 starts to lower $I_L$. $I_L$ then decays gradually as Vc decreases during the rest of $T_L$ until total cutoff, which terminates $T_L$. The incentive to terminate $I_L$ gradually is that an abrupt termination could cause the current through inductor 128 and capacitor 132 to oscillate and thereby drop the current through lighting dimmer 104 to zero.

In some embodiments, M&C circuit 136 is enhanced so as to also activate loading circuit 140 whenever the AC voltage is lower than a given threshold, to prevent cutout of lighting dimmer 104 due to a reverse voltage drop thereon.

Figure 1B:
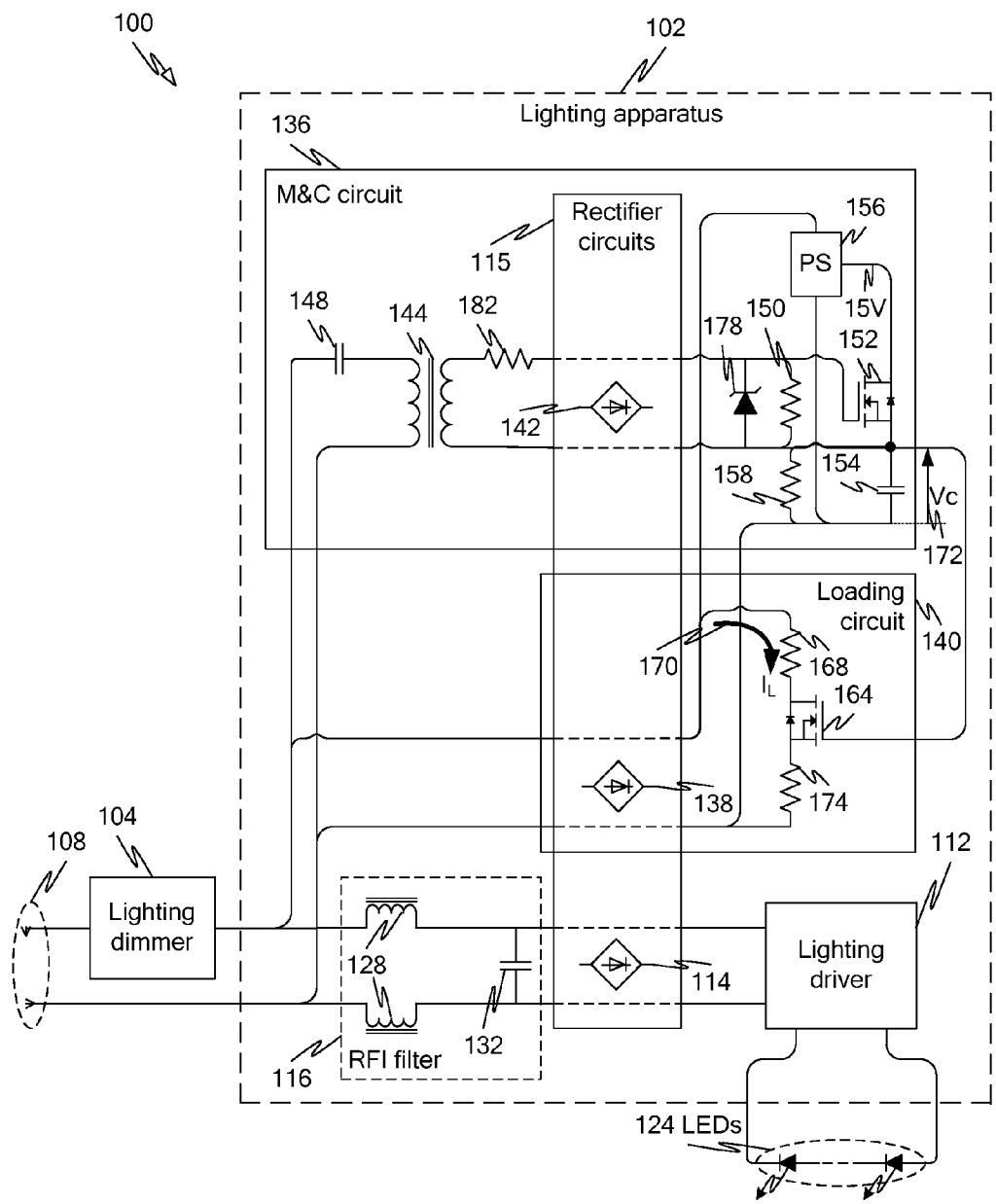
FIG. 1B is a block diagram that schematically illustrates a lighting system and apparatus, in accordance with an alternative embodiment of the present invention.

FIG. 1B is a block diagram that schematically illustrates lighting system 100 in accordance with an alternative embodiment of the present invention. This embodiment comprises a lighting apparatus 102, wherein loading circuit 140 is directly connected to lighting dimmer 104, i.e. at the input of RFI filter 116 rather than at the output thereof.

Figure 1C:
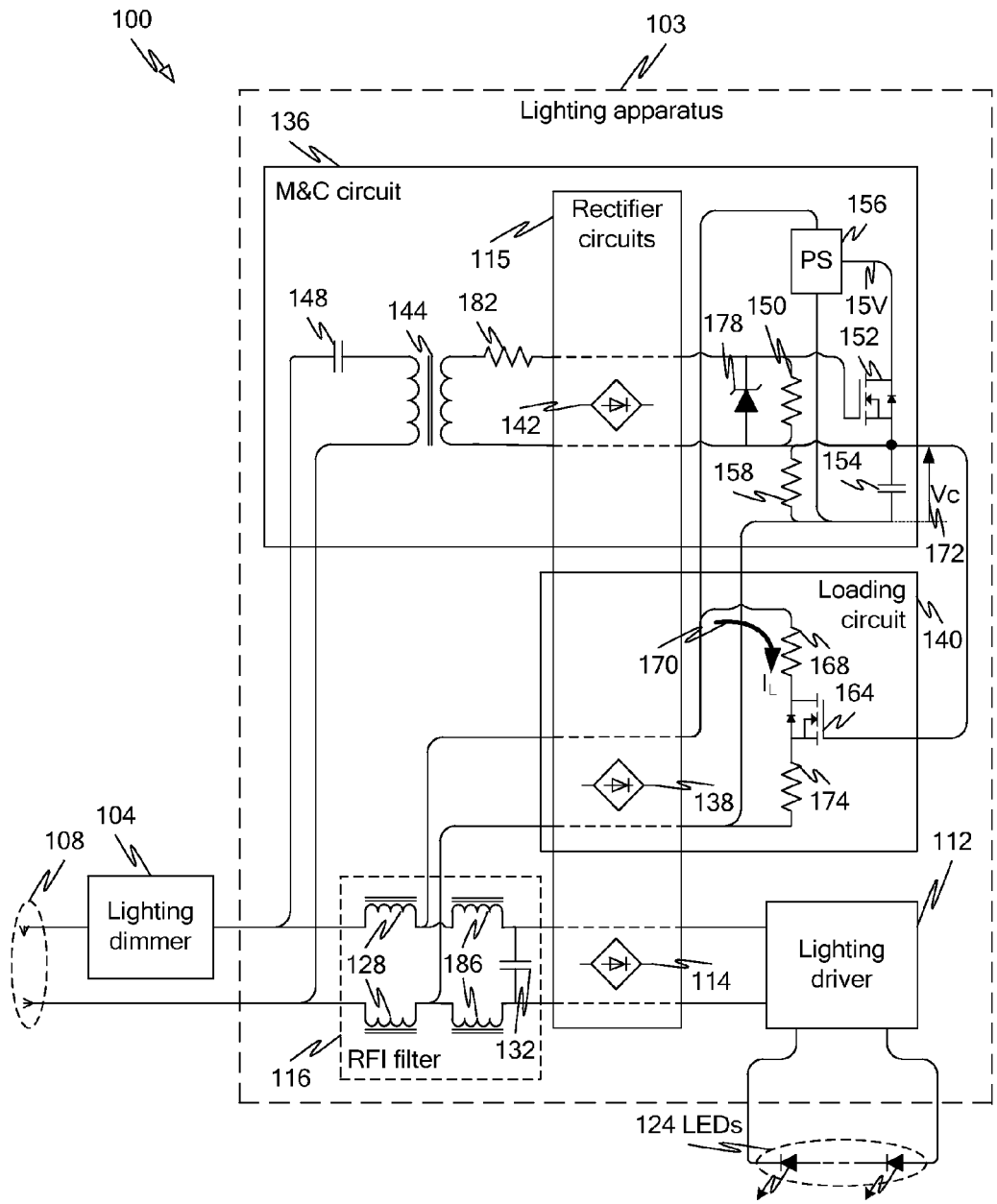
FIG. 1C is a block diagram that schematically illustrates a lighting system and apparatus, in accordance with another alternative embodiment of the present invention.

FIG. 1C is a block diagram that schematically illustrates lighting system 100 in accordance with another alternative embodiment of the present invention. This embodiment comprises a lighting apparatus 103, wherein a second inductor 186 is added between inductor 128 and capacitor 132, and loading circuit 140 is connected between both inductors. Second inductor 186 is substantially smaller than inductor 128 and serves to speed up the effect of loading circuit 140 on lighting dimmer 104.

In an embodiment, switches 148 and 164 are implemented by a Metal-Oxide-Semiconductor Field-Effect Transistor (MOSFET). In other embodiments, other suitable switch types can be used. In an embodiment, lighting apparatuses 101, 102 and 103 are implemented by analog components. In other embodiments the implementation also comprises a programmable processor and or digital components.

The above description has focused on the specific elements essential for understanding certain features of the disclosed techniques. Conventional elements of the system that are not needed for this understanding have been omitted from FIGS. 1A, 1B and 1C for the sake of simplicity, but will be apparent to persons of ordinary skill in the art. The configuration shown in FIGS. 1A, 1B and 1C are example configurations, chosen purely for the sake of conceptual clarity. In alternative embodiments, any other suitable configurations can also be used.

Figure 2:
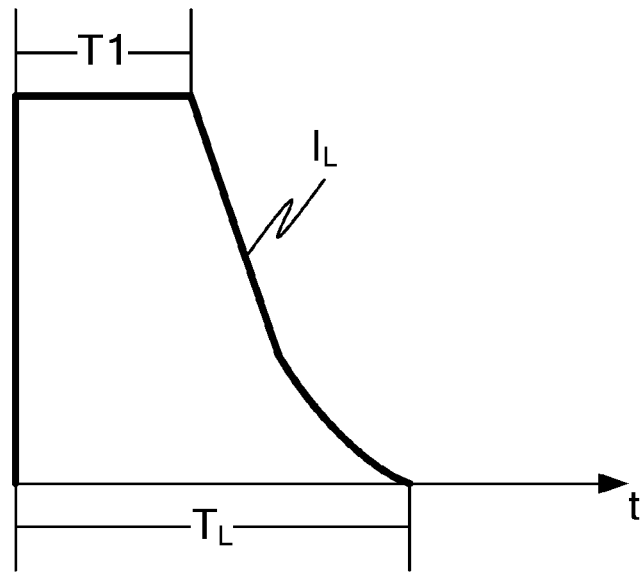
FIG. 2 is a waveform diagram that schematically illustrates a loading current, in accordance with an embodiment of the present invention.

FIG. 2 is a waveform diagram that schematically illustrates loading current 170 denoted $I_L$, in accordance with an embodiment of the present invention. In the figure, there are also shown, T1 and the total loading time $T_L$, which are explained above.

Figure 3:
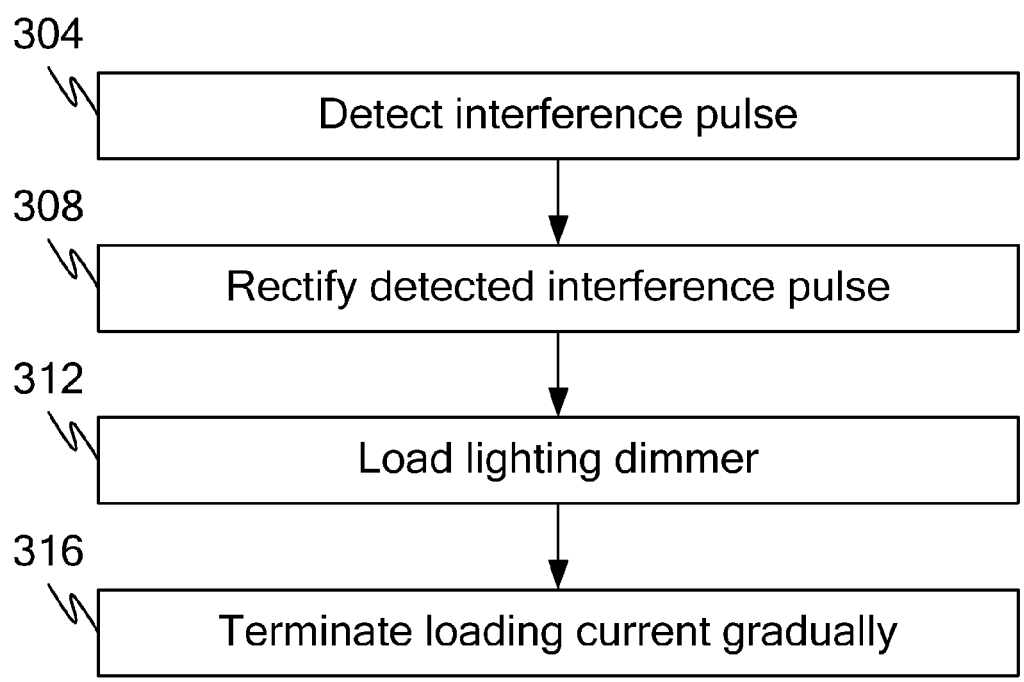
FIG. 3 is a flowchart that schematically illustrates a method for protecting a lighting apparatus against interference pulses, in accordance with an embodiment of the present invention.

FIG. 3 is a flowchart that schematically illustrates a method for protecting a lighting apparatus against interference pulses, in accordance with an embodiment of the present invention. The method begins with a detecting step 304, in which capacitor 148 and transformer 144 transfer the leading edge of a detected interference pulse to the subsequent circuitry of M&C circuit 136. In a rectifying step 308, rectifier circuit 142 converts transferred pulse of any polarity to a positive voltage pulse at the input of switch 152. In a loading step 312, loading circuit 140 applies loading current $I_L$ on lighting dimmer 104. Finally, in a terminating step 316, M&C circuit 136 terminates $I_L$ gradually toward the end of loading time $T_L$.

The flowchart shown in FIG. 3 focuses on the specific method steps essential for understanding certain features of the disclosed techniques. Conventional steps that are not needed for this understanding have been omitted from FIG. 3 for the sake of simplicity, but will be apparent to persons of ordinary skill in the art. The flowchart shown in FIG. 3 is an example flowchart, which was chosen purely for the sake of conceptual clarity. In alternative embodiments, any other suitable flowchart can also be used for illustrating the disclosed method.

Although the embodiments described herein mainly address lighting systems that comprise a lighting dimmer, the methods and systems exemplified by these embodiments can also be used in other power systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A protection circuit for a lighting driver, wherein the lighting driver is coupled to an AC voltage source comprising a lighting dimmer for transferring the AC current and the AC voltage to the lighting driver, the protection circuit comprising:
    a loading circuit, coupled to the AC voltage source and operable to load it with a loading current; and
    a monitoring and control (M&C) circuit, coupled to the AC voltage source for detecting interference pulses thereon and configured to cause the loading circuit to load the AC voltage source with the loading current during a certain loading time starting upon detecting an interference pulse, indiscriminately of the interference pulse polarity, thereby preventing the AC current from dropping to zero in response to the interference pulse,
    wherein the lighting driver is coupled to the lighting dimmer through a radio frequency interference (RFI) filter connected to an output of the lighting dimmer,
    and wherein the RFI filter comprises a filtering capacitor coupled to a filtering inductor through a second inductor, and the loading circuit is coupled to the AC voltage source by being connected to a connection point between the filtering inductor and the second inductor.

2. The protection circuit of claim 1, wherein the M&C circuit comprises a rectifier.

3. The protection circuit of claim 1, wherein the M&C circuit is configured to set the loading time longer than an expected maximum width of the interference pulse.

4. The protection circuit of claim 1, wherein the M&C circuit is further configured to cause the loading circuit to terminate the loading current gradually.

5. The protection circuit of claim 1, wherein the M&C circuit is further configured to cause the loading circuit to load the AC voltage source with the loading current whenever the AC voltage is lower than a given threshold.

6. The protection circuit of claim 1, wherein the lighting driver is configured to drive one or more light emitting diodes (LEDs).

7. The protection circuit of claim 1, wherein the loading circuit is coupled to the AC voltage source by being connected to the RFI filter output.

8. The protection circuit of claim 1, wherein the loading circuit is coupled to the AC voltage source by being connected to the lighting dimmer output.

9. The protection circuit of claim 1 wherein the interference pulse originates from at least one other lighting dimmer connected to the AC voltage source.

10. A lighting apparatus comprising:
a lighting driver;
a radio frequency interference (RFI) filter stage, having an output connected to the lighting driver and an input connected to an output of a lighting dimmer, wherein the lighting dimmer transfers an AC voltage and an AC current received from an AC voltage source; and
a protection circuit comprising:
a loading circuit, coupled to the lighting dimmer and operable to load the lighting dimmer with a loading current; and
a monitoring and control (M&C) circuit, coupled to the lighting dimmer for detecting interference pulses on the AC voltage and configured to cause the loading circuit to load the lighting dimmer with the loading current during a certain loading time starting upon detecting an interference pulse, indiscriminately of the interference pulse polarity, thereby preventing the AC current transferred by the lighting dimmer from dropping to zero in response to the interference pulse,
wherein the RFI filter stage comprises a filtering capacitor coupled to a filtering inductor through a second inductor, and the loading circuit is coupled to the AC voltage source by being connected to a connection point between the filtering inductor and the second inductor.

11. The lighting apparatus of claim 10, wherein the M&C circuit comprises a rectifier.

12. The lighting apparatus of claim 10, wherein the M&C circuit is configured to set the loading time longer than an expected maximum width of the interference pulse.

13. The lighting apparatus of claim 10, wherein the M&C circuit is further configured to cause the loading circuit to terminate the loading current gradually.

14. The lighting apparatus of claim 10, wherein the M&C circuit is further configured to cause the loading circuit to load the lighting dimmer with a loading current whenever the AC voltage is lower than a given threshold.

15. The lighting apparatus of claim 10, wherein the loading circuit is coupled to the lighting dimmer by being connected to the RFI filter output.

16. The lighting apparatus of claim 10, wherein the loading circuit is coupled to the lighting dimmer by being connected to the lighting dimmer output.

17. The lighting apparatus of claim 10, wherein the lighting driver is configured to drive one or more light emitting diodes (LEDs).

18. The lighting apparatus of claim 10 wherein the interference pulse originates from at least one other lighting dimmer connected to the AC voltage source.

19. A method for protecting a lighting system from interference pulses, the lighting system comprising a lighting driver coupled to an AC voltage source comprising a lighting dimmer for transferring the AC current and the AC voltage to the lighting driver, the method comprising:
monitoring the AC voltage source for detecting interference pulses thereon; and
loading the AC voltage source with a loading current from a loading circuit during a certain loading time starting upon detecting an interference pulse, indiscriminately of the interference pulse polarity, thereby preventing the AC current from dropping to zero in response to the interference pulse,
wherein the lighting driver is coupled to the lighting dimmer through a radio frequency interference (RFI) filter connected to an output of the lighting dimmer,
and wherein the RFI filter comprises a filtering capacitor coupled to a filtering inductor through a second inductor, and the loading circuit is coupled to the AC voltage source by being connected to a connection point between the filtering inductor and the second inductor.

20. The method of claim 19, further comprising setting the loading time to be longer than an expected maximum width of the interference pulse.

21. The method of claim 19, further comprising terminating the loading current gradually.

22. The method of claim 19, further comprising loading the AC voltage source with the loading current whenever the AC voltage is lower than a given threshold.

23. The method of claim 19, wherein the lighting driver is configured to drive one or more light emitting diodes (LEDs).

24. The method of claim 19 wherein the interference pulse originates from at least one other lighting dimmer connected to the AC voltage source.

* * * * *